United States Patent
Janssen et al.

(10) Patent No.: US 9,758,940 B2
(45) Date of Patent: Sep. 12, 2017

(54) METHOD FOR CONTROLLING A WATER SLUICE GATE DRIVE FOR A WATER SLUICE GATE HAVING AN ELECTRIC MACHINE, SERVICE CONNECTION, WATER SLUICE GATE DRIVE AND HYDROELECTRIC POWER PLANT

(71) Applicant: Wobben Properties GmbH, Aurich (DE)

(72) Inventors: Andreas Janssen, Dornum (DE); Heinrich Uphoff, Ihlow/Riepe (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 14/654,355

(22) PCT Filed: Dec. 18, 2013

(86) PCT No.: PCT/EP2013/077257
§ 371 (c)(1),
(2) Date: Jun. 19, 2015

(87) PCT Pub. No.: WO2014/096113
PCT Pub. Date: Jun. 26, 2014

(65) Prior Publication Data
US 2015/0330047 A1    Nov. 19, 2015

(30) Foreign Application Priority Data
Dec. 21, 2012   (DE) ......................... 10 2012 224 188

(51) Int. Cl.
*H02P 7/00*        (2016.01)
*E02B 9/02*        (2006.01)
(Continued)

(52) U.S. Cl.
CPC ................ *E02B 9/025* (2013.01); *E02B 7/30* (2013.01); *E02B 7/36* (2013.01); *E02B 8/045* (2013.01);
(Continued)

(58) Field of Classification Search
CPC ....... Y02E 10/28; Y02E 10/22; Y02E 10/226; Y02E 10/38; Y02E 60/17; Y02E 10/223;
(Continued)

(56) References Cited

U.S. PATENT DOCUMENTS 2,847,179 A    8/1958  Payzer et al.
3,153,182 A   10/1964  Choudhury
(Continued)

FOREIGN PATENT DOCUMENTS

CH          518 029 A       1/1972
CN        201362842 Y      12/2009
(Continued)

*Primary Examiner* — Paul Ip
(74) *Attorney, Agent, or Firm* — Seed IP Law Group LLP (57) ABSTRACT

The invention relates to a method for controlling a water sluice gate drive for a water sluice gate, in particular for a roller sluice gate, preferably in a hydroelectric power plant, wherein the drive has an electric machine, in particular has an asynchronous machine, in particular an asynchronous motor/generator. According to the invention, it is provided that the electric machine, in particular an asynchronous machine, has a fan brake, wherein the method comprises the steps of: disengagement of the fan brake in the case that an insufficient power supply is indicated, self-actuated operation of the electric machine, in particular an asynchronous machine, wherein the electric machine, in particular an asynchronous machine, is operated in generative island operation, in which a rotating field is generated in a self-actuating manner.

13 Claims, 4 Drawing Sheets

(51) Int. Cl.
*E02B 8/04* (2006.01)
*H02P 3/04* (2006.01)
*H02P 3/14* (2006.01)
*E02B 7/30* (2006.01)
*F03B 11/00* (2006.01)
*E02B 7/36* (2006.01)
*H02P 3/22* (2006.01)
*H02P 9/46* (2006.01)

(52) U.S. Cl.
CPC .............. *E02B 9/022* (2013.01); *E02B 9/027* (2013.01); *F03B 11/004* (2013.01); *H02P 3/04* (2013.01); *H02P 3/14* (2013.01); *H02P 3/22* (2013.01); *H02P 9/46* (2013.01); *Y02E 10/22* (2013.01); *Y02E 10/226* (2013.01)

(58) Field of Classification Search
CPC ....... Y02E 70/10; Y02E 10/72; F03B 17/061; F03B 13/10; F03B 13/264; F03B 13/08; F03B 15/06; F03B 17/066; F03B 11/02
USPC ..... 318/152, 371, 376, 380; 290/1 C, 42, 43
See application file for complete search history.

(56) References Cited

U.S. PATENT DOCUMENTS

| | | | | |
|---|---|---|---|---|
| 3,733,095 A * | 5/1973 | Sinclair | ............... | F03B 11/00 290/1 R |
| 3,993,913 A * | 11/1976 | Dickman | ............... | E02B 9/08 290/53 |
| 4,149,092 A * | 4/1979 | Cros | ............... | F03B 13/08 290/43 |
| 4,220,222 A * | 9/1980 | Kamaike | ............... | F16D 41/067 187/290 |
| 4,338,525 A * | 7/1982 | Kilgore | ............... | B60L 11/08 290/17 |
| 5,002,158 A * | 3/1991 | Ericson | ............... | B66B 5/22 187/254 |
| 5,323,095 A * | 6/1994 | Kumar | ............... | B60L 7/04 318/152 |
| 5,337,878 A * | 8/1994 | Mehlert | ............... | B66D 5/08 188/171 |
| 6,955,049 B2 * | 10/2005 | Krouse | ............... | F03B 13/10 290/43 |
| 7,012,392 B2 * | 3/2006 | Nguyen | ............... | H02P 3/12 318/371 |
| 7,102,249 B2 | 9/2006 | Wobben | | |
| 7,262,571 B2 * | 8/2007 | Nelson | ............... | H02P 3/22 318/380 |
| 7,436,142 B2 | 10/2008 | Chanal | | |
| 7,633,248 B1 * | 12/2009 | Williams | ............... | B66B 1/302 318/150 |
| 7,923,946 B2 * | 4/2011 | Williams | ............... | B66B 1/302 318/150 |
| 8,054,015 B2 * | 11/2011 | Iwashita | ............... | H02P 3/18 318/372 |
| 8,072,089 B2 * | 12/2011 | Krouse | ............... | F03B 13/08 290/43 |
| 8,244,419 B2 * | 8/2012 | Wegner-Donnelly | .. | B63H 23/24 105/61 |
| 8,333,070 B2 * | 12/2012 | Huang | ............... | F03B 13/06 60/495 |
| 8,616,829 B2 * | 12/2013 | Becker | ............... | F03B 3/04 290/43 |
| 8,901,767 B2 * | 12/2014 | Krouse | ............... | F03B 13/08 290/42 |
| 9,022,358 B2 | 5/2015 | Williams | | |
| 2005/0174081 A1 * | 8/2005 | Nguyen | ............... | H02P 3/12 318/376 |
| 2006/0050462 A1 * | 3/2006 | Nelson | ............... | H02P 3/22 361/103 |
| 2008/0182466 A1 * | 7/2008 | Wegner-Donnelly | .. | B63H 23/24 440/84 |
| 2008/0265813 A1 * | 10/2008 | Eschleman | ............... | H02P 3/22 318/380 |
| 2009/0020371 A1 * | 1/2009 | Wang | ............... | B66B 5/027 187/376 |
| 2009/0174349 A1 * | 7/2009 | Iwashita | ............... | H02P 3/18 318/400.06 |
| 2010/0109325 A1 * | 5/2010 | Hupe | ............... | F03B 13/10 290/31 |
| 2010/0119362 A1 * | 5/2010 | Becker | ............... | F03B 3/04 415/191 |
| 2010/0314168 A1 * | 12/2010 | Williams | ............... | B66B 1/302 175/5 |
| 2012/0007526 A1 * | 1/2012 | Tsai | ............... | H02P 7/29 318/3 |
| 2012/0056424 A1 * | 3/2012 | Holstein | ............... | F03B 13/10 290/43 |
| 2012/0074881 A1 * | 3/2012 | Pant | ............... | B25B 23/147 318/400.09 |
| 2012/0280515 A1 * | 11/2012 | Huang | ............... | F03B 13/06 290/1 C |
| 2012/0292907 A1 * | 11/2012 | Krouse | ............... | F03B 13/08 290/52 |
| 2013/0049362 A1 * | 2/2013 | Arlitt | ............... | F03B 3/126 290/43 |
| 2013/0214533 A1 * | 8/2013 | Hupe | ............... | F03B 13/10 290/43 |
| 2013/0221888 A1 * | 8/2013 | Horikoshi | ............... | H02P 3/22 318/400.29 |
| 2013/0240808 A1 * | 9/2013 | Williams | ............... | B66D 1/12 254/269 |
| 2014/0117667 A1 * | 5/2014 | Holstein | ............... | F03B 11/04 290/43 |

FOREIGN PATENT DOCUMENTS

| | | |
|---|---|---|
| DE | 893 920 C | 10/1953 |
| DE | 80 09 242 U1 | 7/1983 |
| DE | 10 2007 043 123 A1 | 4/2009 |
| DE | 2 2010 003 347 U1 | 7/2010 |
| EP | 0 037 977 A1 | 10/1981 |
| EP | 1 440 240 B1 | 12/2009 |
| EP | 2369169 A2 | 9/2011 |
| GB | 2481268 A | 12/2011 |
| JP | 53-19858 | 2/1978 |
| JP | 5712158 A | 1/1982 |
| JP | 61-269686 A | 11/1986 |
| JP | 63114505 A | 5/1988 |
| JP | 64-37535 U | 3/1989 |
| JP | 7216854 A | 8/1995 |
| JP | 10215599 A | 8/1998 |
| JP | 11280045 A | 10/1999 |
| JP | 2001244217 A | 9/2001 |
| JP | 2002127960 A | 5/2002 |
| JP | 2003-239259 A | 8/2003 |
| JP | 2007225051 A | 9/2007 |
| JP | 2010242313 A | 10/2010 |
| JP | 201163145 A | 3/2011 |
| RU | 102 065 U1 | 2/2011 |
| TV | 417704 U | 1/2001 |
| TW | 200731651 | 8/2007 |
| TW | M393564 U1 | 12/2010 |
| WO | 2012033793 A2 | 3/2012 |

* cited by examiner

METHOD FOR CONTROLLING A WATER SLUICE GATE DRIVE FOR A WATER SLUICE GATE HAVING AN ELECTRIC MACHINE, SERVICE CONNECTION, WATER SLUICE GATE DRIVE AND HYDROELECTRIC POWER PLANT

BACKGROUND

Technical Field

The invention relates to a method for controlling a water sluice gate drive for a water sluice gate, in particular for a roller sluice gate, preferably in a hydroelectric power plant, wherein the drive has an asynchronous machine, in particular an asynchronous motor/generator. In addition, the invention relates to a service connection for controlling a water sluice gate drive for a water sluice gate. In addition, the invention relates to a water sluice gate drive and a hydroelectric power plant.

Description of the Related Art

A hydroelectric power plant is used to convert potential energy in water into electrical energy. In so doing, dammed up or running water in a water collection is fed in the direction of the current via a debris catcher and an inlet grill to a turbine, which is typically disposed in a turbine pipe, (e.g., suction pipe or pressure pipe), and said water thereby drives the turbine. The water leaving the turbine is fed to the further water outlet via an outlet. Depending on the drop height between the water collection and the outlet, a distinction is made between low, middle and high-pressure hydroelectric power plants; here, a drop height may regularly lie in the range between 1 m and up to 10 m, and in some cases even above 15 m. Depending on the drop height, different types of turbines may be used, as is described in EP 1 440 240 B1, for example. Independent of the concrete design of a turbine, it has been shown that these turbines should be operated depending on the load; for example, a load-dependent operation of a turbine can be achieved by means of a variably adjustable turbine geometry, for example by modifying the pitch angle of turbine blades. It may also be necessary to recognize an emergency closure situation and, in so doing, to close a water sluice gate, which has been provided for the protection of a hydroelectric power plant; this may be the case, for example, with a fully open turbine geometry, including during normal operational or test situations; e.g., in the case of turbine blades that have been pitched out of the current (turbine on a channel way). This may also apply to real emergency situations; for example in the case of the intrusion of debris that may have an adverse effect on a turbine, or if water discharge must be stopped in the event of technical problems in the hydroelectric machine and/or turbine of a hydroelectric power plant. In the present case, an emergency closure situation is understood to mean any operating situation in which it is necessary or useful to close the water sluice gate in front of the turbine or in front of the turbine pipe of the turbine respectively.

In the present case, a water sluice gate is generally understood to be a part of a weir system, in particular in a hydroelectric power plant, which has a movable protection device, in particular a vertical sluice gate, to control the water flowing though the weir system, in particular in a hydroelectric power plant. A vertical sluice gate may be guided in the recesses of weir posts for example, which posts are anchored in the weir system. As a rule, a distinction is made between a sliding sluice gate and a roller sluice gate, depending on whether the vertical sluice gate can be moved in guide rails and/or is guided with the aid of guide rollers such as the running and guide rollers of a roller arrangement. A water sluice gate drive is generally understood to be any drive that is suitable for setting the vertical sluice gate in motion or to inhibit such motion, possibly in combination with a gear unit, either directly or by means of a roller arrangement such as running and guide rollers.

In an operating situation, in particular an emergency closure situation, what is problematic on the one hand is that a protection device such as a vertical sluice gate having a comparatively high weight force must be swiftly set in motion. While a weight force of the vertical sluice gate is at first basically advantageous in initiating the movement, on the other hand, the considerable power of resistance generated by the weight force must be overcome in order to move a vertical sluice gate. The power of resistance is especially attributable to the frictional force that acts on the guide of the vertical sluice gate, in particular also as a result of the hydrodynamic power. Vertical sluice gates may have weight forces of possibly several tons up to the double-digit ton range.

On the one hand, a vertical sluice gate or similar protection device may have to be moved against inertial forces and especially frictional forces, possibly in the shortest possible time, in an operating situation such as an emergency closure situation in order to prevent damage, in particular in the worst case to prevent the destruction of the turbine system and/or the hydroelectric machine (in particular comprising a generator or similar electric hydroelectric machine, in particular comprising some kind of gearing mechanism or similar drive train components and/or current-forming components) of the hydroelectric power plant.

Above all, movement of a vertical sluice gate and the control of a water sluice gate drive upstream therefrom is especially critical when the emergency closure situation coincides with a situation in which a power supply is no longer available for the water sluice gate drive; this situation proves to be especially problematic in the event that an electric machine, thus an electric motor/generator, is provided in the water sluice gate drive. This is because in the above mentioned emergency closure situation without a power supply, the conventional measures for braking the electric machine in the water sluice gate drive are only conditionally available as a result of the absent power supply.

In such a situation, it would be expected that a vertical sluice gate of a water sluice gate that is being freely brought down during an emergency closure situation would cause massive damage to the guide of the vertical sluice gate at the point at which it impacts the ground; this would be due to the inertial forces of an impacting vertical sluice gate having a high weight. For example, the forces of a 30 ton vertical sluice gate with a drop height of 10 m could result in the destruction of at least the guide and the bottom of the water sluice gate as well as possibly the vertical sluice gate itself. In particular, the jamming of the aforementioned vertical sluice gate in the guide may be the undesired result.

As a result, not only must a rapid movement of the vertical sluice gate in an emergency closure situation be ensured in the event of an absent power supply, but in addition, an appropriate control of the water sluice gate drive must be ensured in order to prevent the vertical sluice gate from striking the ground unhindered.

The German Patent and Trademark Office has researched the following prior art in the priority application for this application: DE 80 09 242 111 U1 and DE 893 920.

BRIEF SUMMARY

One or more embodiments of the present invention are directed to a method and a device for controlling a water sluice gate drive having an asynchronous motor for a water sluice gate, in particular for a roller sluice gate, which ensures in the case of an emergency closure, the passive lowering of the vertical sluice gate, i.e., in particular without a power supply, even without mains supply and even without a safeguard of an uninterrupted power supply, and in so doing, nevertheless preventing the vertical sluice gate from stopping without braking or otherwise uncontrolled.

One or more embodiments are directed to a method and a device for controlling a water sluice gate drive, preferably in operation, which, with regard to prior art, are improved, and which, however, may address at least one of the problems described above. At least one solution alternative to a solution known in prior art shall be proposed. In particular, a device and a method are to be specified, by means of which it is possible to react reliably and at the same time safely in an emergency closure situation while avoiding further damage.

According to one embodiment of the invention, there is provided a asynchronous motor that is equipped with a fan brake and according to the method, the detection of an emergency closure situation has the following steps:

disengagement of the fan brake in the event that an insufficient power supply is indicated, self-actuated operation of the electric machine, wherein the electric machine is operated in generative island operation, in which a rotating field is generated in a self-actuating manner.

The electric machine (motor/generator) is, in particular, an asynchronous machine.

An asynchronous motor/generator (asynchronous machine) is preferably provided for use in the water sluice gate drive. The use of an asynchronous machine in a water sluice gate drive has indeed proven to be fundamentally advantageous, since such a machine is robust and comparatively low-maintenance; this is mainly because operation is possible without brushes. In the case of a three-phase asynchronous motor, the mode of operation is based on a rotating field, which is generated by the stator winding of the stationary part of the asynchronous motor, namely the stator. A rotating squirrel-cage rotor (also referred to as the cage) is located on the primary side of the three-phase asynchronous motor implemented by the stator winding, which cage represents the secondary side. The current that develops there depends on the rotational speed. The rotor of the asynchronous motor typically rotates more slowly than the rotating field on the coils of the primary side. The control of the asynchronous machine, in particular of the asynchronous motor, is primarily done by means of electromechanical contactors. The machine speed, in particular the motor speed, can be controlled by means of converters such as frequency converters, for example, by reducing and increasing the frequency. This is especially useful in a system such as a water sluice gate drive, which may possibly require a variable rotational speed without using a variable gearbox. In a water sluice gate drive system, a gearbox for actuating the roller arrangement is also preferred, in particular provided with at least a guide roller for moving a roller sluice gate.

The method according to one embodiment of the invention has proven to be sufficiently reliable and at the same time practicable, in particular without avoiding further damage, even in the event of an absent power supply. The reliable and damage-free implementation of the method in an emergency closure situation, even in the absence of a mains supply and also when no uninterrupted power supply is available, is especially advantageous.

Within the context of an especially preferred further embodiment, in particular after the detection of an emergency closure situation, the method also comprises the following steps: detection of an insufficient, in particular absent, power supply. In particular the absence of line current or a line voltage respectively, and/or the absence of an uninterrupted power supply can be detected. The absence of an uninterrupted power supply may also occur because an uninterrupted power supply system (UPS) is not installed. An advantage of one or more embodiments of the invention described here is that the provision of an uninterrupted power supply system (UPS) is advantageously not necessary, since one or more embodiments of the invention makes the safe operation of the water sluice gate drive possible without line current or without line voltage even in an emergency closure situation; this leads to a reduction in components and costs.

One embodiment of the invention also leads to a service connection for controlling a water sluice gate drive for a water sluice gate, in particular for a roller sluice gate, preferably in a hydroelectric power plant, wherein the drive has an asynchronous machine, in particular an asynchronous motor/generator. According to one embodiment of the invention, it is provided that the electric machine, in particular an asynchronous machine, has a fan brake (230), wherein the service connection has a first power phase element, in particular for normal operation, and a second power phase element, in particular for emergency operation, wherein the second power phase element is designed to operate the electric machine, in particular an asynchronous machine, in a self-actuating manner in generative island operation, wherein a rotating field can be generated in a self-actuating manner.

In an especially preferred further embodiment, a rotating field can be generated in a self-actuating manner, in particular having a first stage of load resistors for a first control and/or adjustment control stage and a second stage of load resistors for a second control and/or adjustment control stage. Different braking resistors can advantageously be realized by means thereof.

One embodiment of the invention also leads to a water sluice gate drive. In particular, the water sluice gate drive is designed for the control of an asynchronous machine for a water sluice gate, preferably designed in the form of a roller sluice gate drive for a roller sluice gate.

One embodiment of the invention also leads to a hydroelectric power plant having a water sluice gate drive of the aforementioned type. In the case of a hydroelectric power plant, the water sluice gate drive is designed to control an electric machine, in particular an asynchronous machine, for a water sluice gate, in particular for a roller sluice gate, wherein the electric machine, in particular an asynchronous machine, has a fan brake.

In one embodiment of the invention, the electric machine, in particular an asynchronous machine, has a fan brake and in addition an indicating unit. The indicating unit is advantageously designed to detect and/or indicate an emergency closure situation, in particular also a failure of the supply current or supply voltage respectively;

an actuator unit, which is designed to disengage the fan brake, in particular in the event that an absent power supply is indicated;

a service connection for the self-actuated operation of the asynchronous machine, wherein the service connection is designed to operate the asynchronous machine (as an asynchronous generator) in generative island operation, wherein a rotating field can be generated in a self-actuating manner.

Advantageous further embodiments of the invention can be inferred from the sub-claims and specify in detail advantageous options for realizing the concept explained above within the context of the object while specifying further advantages.

In a further developed variant, the method is also applicable when a power supply is detected. In particular, the power-based measures for braking the asynchronous motor, and thereby the vertical sluice gate, such as a reverse-current braking, lowering or regenerative braking, or direct-current braking of the asynchronous motor are especially suitable in this case.

In particular in the event that a sufficient power supply is indicated, the following is provided: detection of the power supply, in particular a power supply from a grid and/or a system for an uninterrupted power supply (UPS), wherein the electric machine, in particular an asynchronous machine, is operated using the power supply. The electric machine, in particular an asynchronous machine, may then be operated at variable rotational speeds, in particular in the event that a sufficient power supply is indicated. In this case, it may in particular be provided that the electric machine, in particular the asynchronous machine, is operated to slowly close the water sluice gate and/or an electric deceleration ramp is run for the asynchronous machine. This applies in particular in the event that a sufficient power supply is indicated, in particular under the electrical regulation of the asynchronous machine and/or of a frequency converter.

In addition or alternatively, both in the case that an insufficient, in particular an absent, power supply, e.g., an insufficient power supply from a grid and/or insufficient power supply from a system for an uninterrupted power supply (UPS), is detected and additionally in particular in the event that an emergency closure situation is detected, it may be provided that an electromechanical deceleration ramp is run for the asynchronous motor under the regulation and/or preferably control of the fan brake. In general, a known fan brake may be provided. In particular in the context of a further embodiment, a fan brake is provided in such a way that an asynchronous motor/generator or similar electric machine is mechanically stopped in a non-energized state. For example, brake springs may press axially movable armature disks of a rotor on a friction lining against the stator. For example, the braking torque may be transmitted to a shaft by means of a keyway connection of a friction liner support or an interlocked drive plate respectively. If a DC voltage is applied to the brake coil, the armature brake with brake lining lifts so that the motor can run up. This exemplary description of a fan brake only serves to illustrate a possible way in which a fan brake might function, however the invention is not limited to a specific embodiment of a fan brake.

Within the context of a preferred further embodiment of the method, upon the detection of an emergency closure situation, the fan brake disengages with the automatic and self-actuated lifting of the fan brake. In particular under the gravitational effect of the water sluice gate, in particular of the vertical sluice gate, the asynchronous motor can be powered/for example in that the vertical sluice gate pulls on the cord of the guide rollers and the force of the cord is transmitted to the asynchronous machine by means of the gearing mechanism. Specifically, the asynchronous machine can be actuated under the influence of a weight force of a vertical sluice gate of the water sluice gate. In particular, this may be done by means of a capacitor array of excitation capacitors. In this case, the asynchronous motor or similar electric machine generates a rotating field in generative island operation in a self-actuating manner.

In particular, even in the case of an insufficient power supply, the asynchronous machine or similar electric machine may be operated at different, in particular largely predetermined, fixed first and second rotational speeds, in particular in the event that an insufficient power supply is indicated, in particular with no power supply. In concrete terms, at least one control and/or adjustment control stage, in particular a first control and/or adjustment control stage as a brake stage, and a second control and/or adjustment control stage as a stop stage may be run for the asynchronous machine while load shifting to the fan brake.

It is especially preferred that a braking of the asynchronous machine (in the event that the asynchronous generator is operated in island operation) be done by connecting a first stage of load resistors. Brake control of the asynchronous machine may especially be done in a manner depending on voltage and/or depending on a position of the water sluice gate. It has proven to be particularly preferred that the asynchronous machine be regulated in at least two speed steps. In so doing, it has proven to be advantageous to connect a first and a second stage of load resistors depending on the voltage and/or depending on a position of the water sluice gate, in particular a first and a second stage of load resistors.

In the case of a water sluice gate drive, it has proven to be especially advantageous that the actuator unit have a gas spring accumulator, by means of which the fan brake may be disengaged. In addition, the actuator unit preferably has a control valve connected to a power source (i.e., during normal operation, with a mains supply or with a power supply from an uninterrupted electric circuit) in an actuator pressure line between the gas spring accumulator and the fan brake. Since the control valve is therefore open when not energized, the actuator unit ensures a supply of gas pressure to the fan brake by opening the control valve, which is open when not energized, in the actuator pressure line between the gas spring accumulator and the fan brake. Under the gas pressure, the fan brake can open automatically and in a self-actuated manner against a spring force of a brake spring of the fan brake and thereby release the rotor of the electric machine for a rotation in the stator; thus in order to generate a rotating field.

The service connection preferably has a quantity of capacitors and at least a first quantity of connectable load resistors. A quantity of connectable load resistors can preferably be connected depending on the voltage and/or depending on a position of the water sluice gate, and in particular a single or a quantity of two, three or more load resistors may be connected individually or in groups. An electromechanical contactor may preferably be provided between the capacitor and load resistor, in order to connect the quantity of connectable load resistors, preferably depending on the voltage and/or depending on a position of the water sluice gate. In principle, in addition to or as an alternative to a voltage dependency and/or position dependency, another means of dependency for connection may also be established (for example a timer or another dependency-regulating or control means), in order to implement a braking resistance for the water sluice gate, in particular by connecting a quantity of connectable load resistors. An electromechanical contactor preferably also has an electric control line and an electric load line, in particular a three-phase line.

Within the context of an especially preferred further embodiment of the invention, it is provided that the service connection has a control, which is designed to connect a first quantity of connectable load resistors and/or a second quantity of connectable load resistors, in particular to connect these depending on the voltage and/or depending on a position of the water sluice gate and/or depending on another means of dependency. The further embodiment has recognized that it is especially advantageous that a lowering of a vertical sluice gate of the water sluice gate be provided with a two or more step control and/or adjustment control. A first stage of a control and/or adjustment control may in particular be configured to set the vertical sluice gate into motion in an especially rapid manner. A second stage of the control and/or adjustment control may preferably be configured to effectively implement the braking of the vertical sluice gate. Thus an electromechanical deceleration ramp for the asynchronous machine may be configured in such a way that for a large part of the path of the vertical sluice gate, a first quantity of connectable load resistors ensures the most effective actuation of the water sluice gate drive and therefore the most effective lowering of the vertical sluice gate. For a smaller part of the path, the electromechanical deceleration ramp for the asynchronous machine may be designed to brake the water sluice gate drive as effectively as possible, and thereby to ensure the most effective braking of the vertical sluice gate. For example, a large part of the path may comprise between 50% and 95% of the lowering path of the vertical sluice gate. For example, a smaller part of the path may comprise between 50% and 5% of the lowering path of the vertical sluice gate.

BRIEF DESCRIPTION OF THE SEVERAL VIEWS OF THE DRAWINGS

Embodiments of the invention will now be described below based on the drawing compared to the prior art, which is also shown in part. This is not necessarily intended to illustrate the exemplary embodiments to scale, but rather, where it serves as an explanation, the drawing is presented in a schematic and/or slightly distorted form. In regard to amendments to the teachings which are directly recognizable from the drawing, we refer to the applicable prior art. In this context, it has to be considered that a large variety of modifications and changes regarding the form and the detail of an embodiment can be made without needing to deviate from the general idea of the invention. The features of the invention disclosed in the description, in the drawing and in the claims may be essential for the further embodiment of the invention individually as well as in any combination with each other. Furthermore, all combinations of at least two of the features disclosed in the description, the drawing and/or the Claims fall within the scope of the invention. The general idea of the invention is not limited to the exact form or the detail of the preferred embodiment shown and described below, nor is it limited to subject matter which would be limited in comparison to the subject matter asserted in the Claims. Within a specified range of dimension values, values within the specified limits shall also be disclosed and be able to be used and asserted at will as threshold values. Further advantages, features and details of the invention can be inferred from the following description of the preferred exemplary embodiments as well as from the drawing; the drawing shows in:

DETAILED DESCRIPTION

Figure 1:
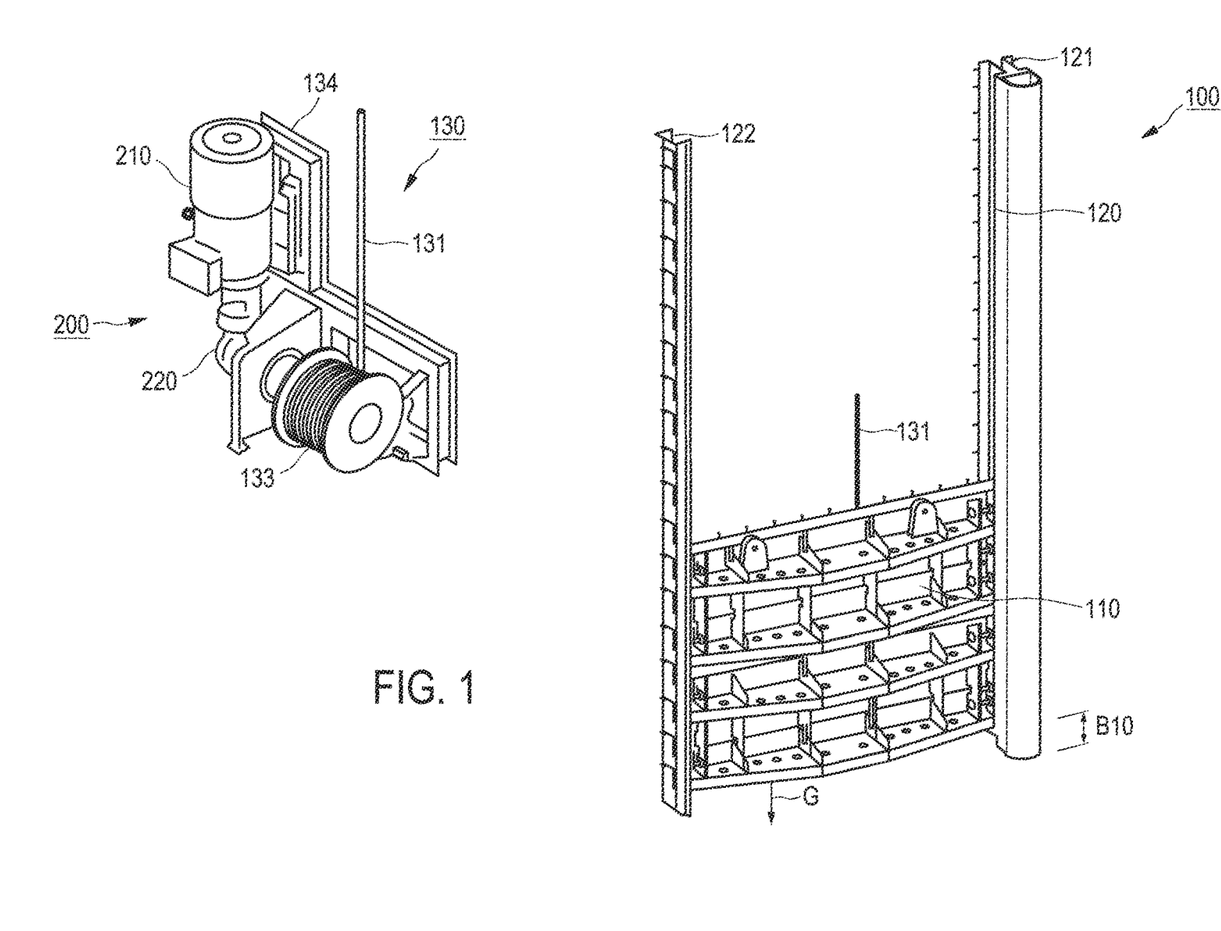
FIG. 1 an exemplary view of a water sluice gate and of a water sluice gate drive, wherein the water sluice gate is designed as a roller sluice gate of a weir system in a hydroelectric power plant.
Figure 2:
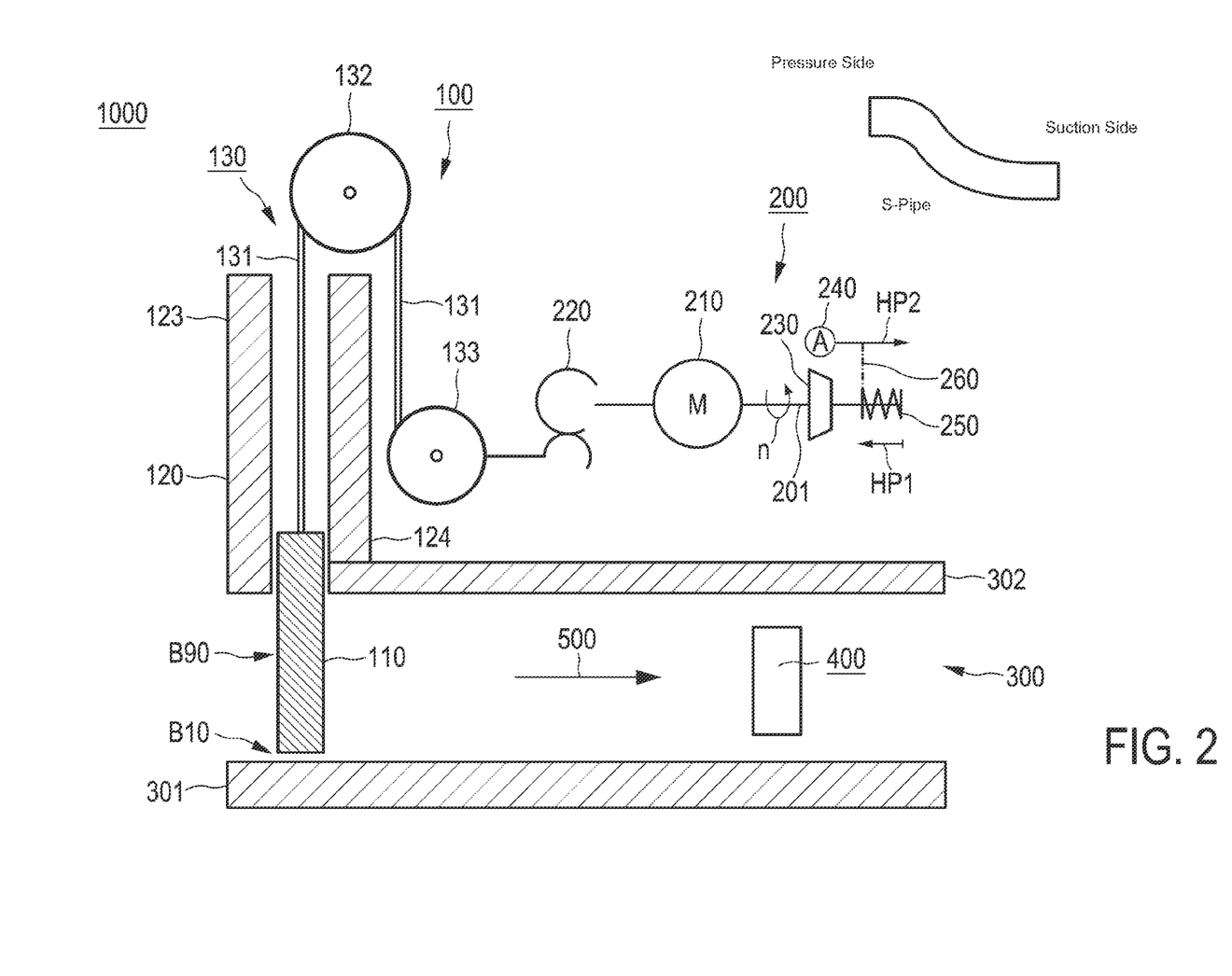
FIG. 2 a schematic illustration of how a water sluice gate drive can be connected to a roller sluice gate and an asynchronous machine, which has a fan brake, as well as to an indicating unit, an actuator unit and a service connection of an especially preferred embodiment of a water sluice gate drive.

FIG. 1 shows a detail of an exemplary construction of a roller sluice gate for a hydroelectric power plant 1000 shown in greater detail in FIG. 2. In order to illustrate the water sluice gate 100 (here, a roller sluice gate), the weir has a vertical sluice gate 110 in a sluice gate mount 120 on a transmission winding mechanism 130. The sluice gate mount 120 has a first free-sliding rail 121 and a second free-sliding rail 122, which are designed each having a groove for the formation of a slide rail; the vertical sluice gate 110 is slidably mounted on both sides in the groove of the first and second free-sliding rails 121, 122. The vertical sluice gate 110 is held by a cord 131 of the transmission winding mechanism 130 from FIG. 2, wherein the cord 131, in the present case in the form of a cable, is guided from the vertical sluice gate 110 over guide rollers, specifically over a deflection roller 132, and over a cable drum 133 on a frame 101 of the transmission winding mechanism 130. The cable drum is actuated by a gearing mechanism 220 of an asynchronous machine 210 of a water sluice gate drive 200, wherein a fan brake 230 is allocated to the asynchronous machine 210. In addition, FIG. 1 shows the arrangement of the asynchronous machine 210 of the gearing mechanism 220 and the cable drum 133 with the cord 131 of the water sluice gate 100 in the form of the roller sluice gate.

The vertical sluice gate 110 may have a substantial weight in the ton range, in the present case for example having a weight of 32 t, and a drop height in the guide of the sluice gate mount 120 may be several meters, for example up to 10 m or 15 m. In the case of an undamped impact of the vertical sluice gate 110 in the lower position shown in FIG. 1, i.e., in the case of a free-fall closure, at least the vertical sluice gate 110 and the mount thereof would be destroyed, which in the worst case scenario would make the water sluice gate 100 unusable; therefore suitable means for the passive and, at the same time, controlled movement and braking of the vertical sluice gate 110 in the lowered position must be provided.

An emergency closure of the roller sluice gate may occur in the event of a risk of an overspeed event in the hydroelectric turbine (thus, for example in the event that the turbine blades or turbine buckets or the like are pitched out). Another less likely case may be the threat of the entry of a foreign substance, for example from the bed load, when this load may have overcome a debris catcher or an inlet grill. A water sluice gate 100 in the form shown in FIG. 1 or in the form shown in FIG. 2 may be disposed directly in front of a turbine pipe of a schematically depicted turbine 400, as shown. Here, a vertical sluice gate 110 of the roller sluice gate serves as a gate valve in front of a water flow 500 of the hydroelectric power plant 1000. A water sluice gate 100 may also be formed in a position upstream from the turbine pipe, however, for example as part of the grate system or as part of the debris catcher (not shown here).

Still referring to FIG. 2, a front and back part 123, 124 of a guide of the sluice gate mount 120 having the vertical sluice gate 110 on the cord 131 are schematically shown in detail. The vertical sluice gate 110, on the other hand, is shown in the lowered position, here in an emergency closure position, i.e., resting on the lower limit 301 and adjacent to an upper limit 302 of the turbine pipe 300 in front of the turbine 400. A special control range, explained according to the further embodiment, for braking the vertical sluice gate 110 with the roller sluice gate drive 200 is provided for the stretch of the lower drop region B10 immediately above the lower limit 301. A control and/or adjustment control of the water sluice gate drive 200 for the stretch of the overlying travel region B90 is regulated by the preferred first part, described here in greater detail.

Further referencing FIG. 2, in addition to the asynchronous machine 210 having a variable rotational speed n, which may be operated as a motor or generator, and the gearing mechanism 220, the water sluice gate drive 200 also has the fan brake 230 allocated to the asynchronous machine 210, which is located on a common shaft 201 with a rotor of the asynchronous machine 210. In concrete terms, the fan brake 230 in this embodiment is formed in that the rotor of the asynchronous machine 210 can be connected to the stator of the asynchronous machine 210 by friction contact. It is provided that an actuator unit 240 acts against the force of a brake spring 250; this is achieved by means of suitable connecting means 260. The brake spring 250 has the effect that, without actuating the actuator unit 240, a rotor is frictionally engaged with the stator of the asynchronous machine 210 in a non-positive frictional engagement. Without actuating the actuator unit 240, the fan brake 230 engages and the asynchronous machine 210 is secured.

In a first holding state not shown in FIG. 2, the vertical sluice gate 110 is held in an upper position, releasing the turbine pipe 300 to allow water 500 to flow through the turbine pipe 300, thereby driving the turbine 400. The fan brake does not need to accommodate the weight force of the vertical sluice gate 110; this weight force may be arrested and/or held by other design elements not shown in greater detail here.

The holding position HP1 is indicated in FIG. 2 by a first arrow. As indicated in FIG. 2 by a second arrow, the vertical sluice gate 110 can be transferred into a second secured state, as shown in FIG. 2, i.e., into a lower holding position HP2, after the actuator unit 240 has released the fan brake 230. In so doing, the pressure of the brake spring 250 on the rotor is withdrawn to represent a frictional engagement between the rotor and stator due to the force effect of the actuator unit 240 on the brake spring 250. In that case, the rotor of the asynchronous machine 210 in the stator can be rotated in the direction of a generative operation according to the rotational speed n for the self-actuated generation of a rotating field.

Figure 3:
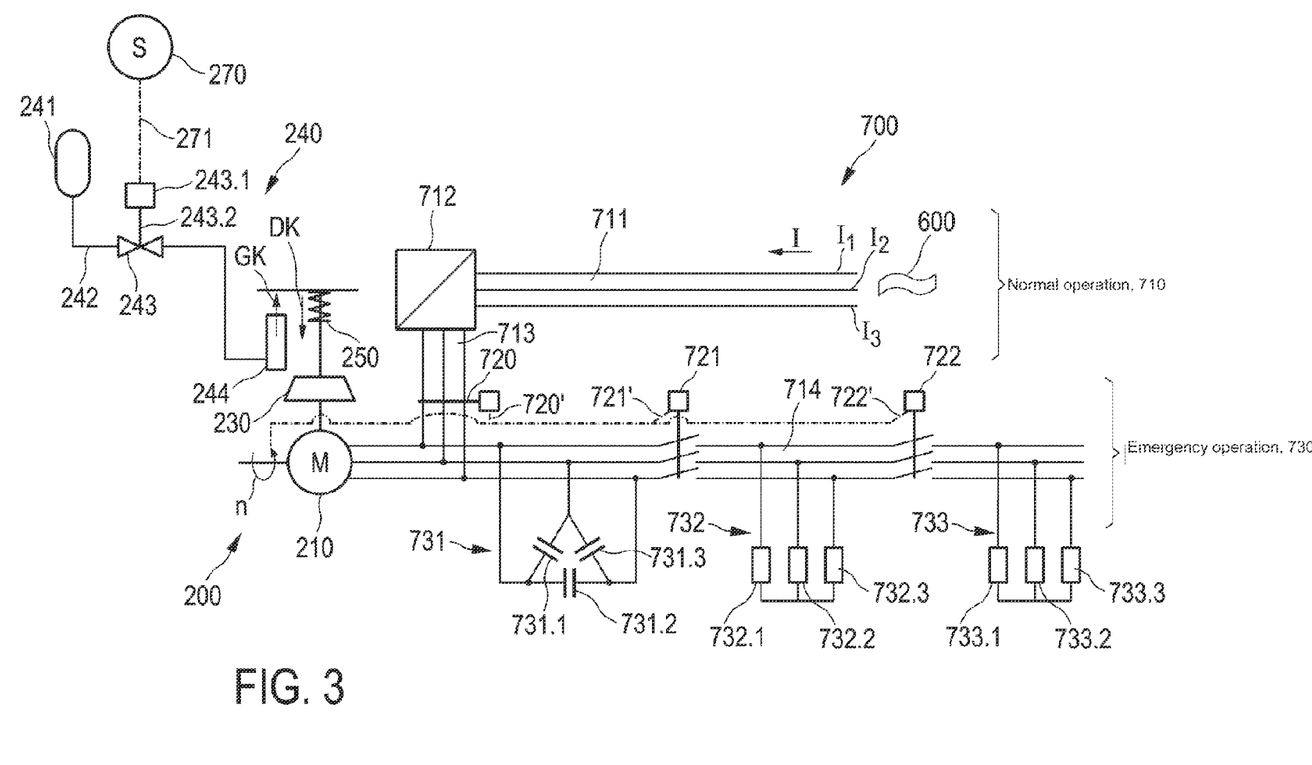
FIG. 3 the synopsis of a water sluice gate drive according to a preferred embodiment having a first part of an operation control for conventional operation of an asynchronous machine having a power supply from the grid, however according to the preferred embodiment, without an uninterrupted power supply as well as having a second part of an operation control, passively designed, for a reliable and damage-free mode of operation, wherein an indicating unit is provided with an actuator unit and a second power phase element for the second part of the operation control.

The operation of the water sluice gate drive 200 is shown in detail in FIG. 3. To this end, similar or identical features or features having a similar or identical function are specifically referenced using the same reference signs so that these reference signs may be referenced in the foregoing description.

In the present case of the embodiment from FIG. 3, the actuator unit 240 is specifically designed having a pressure accumulator 241, which can be opened to a gas spring accumulator 244 by means of an actuator pressure line 242 and a control valve 243 disposed therein. An indicating unit 270 is provided, by means of which the signal for an emergency closure situation can be passed to a control connection 243.1 of the control valve 243 by means of a signal line 271. The control connection 243.1 may be a magnetic coil, for example, for the movement of a valve spool 243.2 of the control valve 243. If the gas spring accumulator 244 is pressurized with a form of pressure, this spring accumulator can disengage the brake spring 250; this with a counter-force GK against the compression force DK of the brake spring 250. In so doing, a rotor in a stator of the asynchronous machine 210 can be guided to a movable position and can move therein: this corresponds to the disengagement of the fan brake 230.

The mechanical operating principle of the roller sluice gate drive 200 is as follows. The winch system, in this case a transmission winding mechanism 130 of guide rollers, is fed from a cord 131 on a cable drum 133. The cable drum is actuated by the water sluice gate drive 200, specifically entirely by the asynchronous machine 210, which, functioning as a motor, drives the gearing mechanism 220 and by means thereof the deflection roller 133. Thus the vertical sluice gate 110 of the roller sluice gate may serve as a closure for the water flow 500 or the turbine pipe 300 of the hydroelectric power plant 1000.

During normal operation, a grid 600 is available to represent a three-phase current I, which is shown here with lines for three phases $I_1$, $I_2$, $I_3$. The current can be fed via a first power phase element 710 of the asynchronous machine 210 without an uninterrupted power supply and only by means of a frequency converter 712 in a first part of a service connection 700. When a relay or similar electromechanical contactor 720, here in the form of a normal operation contactor, is in a de-energized state, the phases $I_1$, $I_2$, $I_3$ of the power supply line I are electrically connected to the asynchronous machine 210 so that this machine can be actuated. To this end, the normal operation contactor 720 is located in an electrical branch line 713 for connection to the mains power line 711 by means of the frequency converter 712; this occurs in a de-energized, i.e., the non-activated state of the contactor. The frequency converter 712 is a three-phase-frequency converter having braking resistors. The uninterrupted power supply system may be provided in the present case; this may be for an operating voltage of 400 V with three phases for example, having a corresponding quantity of batteries and a bypass. As in the present case, the fan brake 230 may act by means of a braking pressure, which is presently provided by means of a brake spring force from the brake spring 250.

When the contactor 720 for normal operation is in a state in which it is not acted on by a control current, this contactor opens and disconnects the electric branch line 713. A corresponding control signal line 720 is conducted to the normal operation contactor 720. This state corresponds to a state of the asynchronous machine 210 without power supply, whether this be a power supply from the grid 600 or a power supply from an uninterrupted power supply UPS which in principle is not provided in the present case, but which may be available in individual cases. The asynchronous machine 210 may be operated at 400 V, for example, and having a frequency that falls between 3 and 50 Hz with a corresponding AC voltage. In the second part of a service connection 700 provided for emergency operation, the service connection 700 is specially configured in a second power phase element 730 for generative island operation. In island operation, the asynchronous machine 210 is configured for the operation of a generator in island operation.

In the above described disengagement of the fan brake 230, the weight force G of a vertical sluice gate 110 of the water sluice gate 100 generates a rotational movement of the rotor in the stator of the asynchronous machine 210 and thus ensures the self-provision of the control and/or adjustment control of the drive 200. A capacitor array 731 of excitation capacitors, a first arrangement 732, a quantity of load resistors in turn for the three phases $I_1$, $I_2$, $I_3$ and again a second arrangement 733 of load resistors for the three phases $I_1$, $I_2$, $I_3$ of an electric emergency operation line 714 may be connected by means of suitable load contactors for the emergency operation part 730. A first load contactor can be connected to a control current, which is generated by means of the reactive power and the rotating field of the excitation capacitors, for example. The second emergency operation contactor 716 can likewise be connected as a control current by means of the rotating field and current generated thereby. Corresponding control signal lines 721', 722' are run to the emergency operation contactors 721, 722.

In principle, an asynchronous machine 210 may be operated as a generator under limited conditions in island operation, i.e., without being connected to the grid 600, for example as an emergency power supply. A preferred option for island operation is operation as a self-excited induction generator. Without being connected to an external three-phase network 600, which is capable of providing inductive and/or capacitive reactive power to the magnetization, the reactive power may be provided by means of a parallel-connected capacitor bank 731, which itself provides capacitive reactive power; in particular, the motor generates inductive reactive power.

In the case of island operation, the frequency, in particular a constant frequency, is determined by a frequency converter 712. The voltage amplitude may be regulated taking into account the maximum phase current amplitude. In the case of an overload, the voltage amplitude may be lowered as needed. With suitable regulation or control electronics, a high quality island operation can be implemented by means of the asynchronous generator, as suggested here. To this end, a quantity of excitation capacitors 731.1, 731.2, 731.3, a first quantity of connectable load resistors 732.1, 732.2, 732.3 and a second quantity of connectable load resistors 733.1, 733.2, 733.3 are provided; three each for a first, second and third phase of the second power phase element 730.

In principle, no uninterrupted power supply is needed in the first part of the service connection of the first power phase element 710 on the grid 600; the advantage of the embodiment presented here is in the fact that this uninterrupted power source can be dispensed with. In principle, uninterrupted power supplies (UPS) are used to ensure the provision of critical electric loads in the event of disruptions to the grid 600. However in simple designs of an uninterrupted power supply UPS, the power supply may be interrupted for a short period of time, e.g., several milliseconds, which is tolerated by the connected consumers without loss of function.

Figure 4:
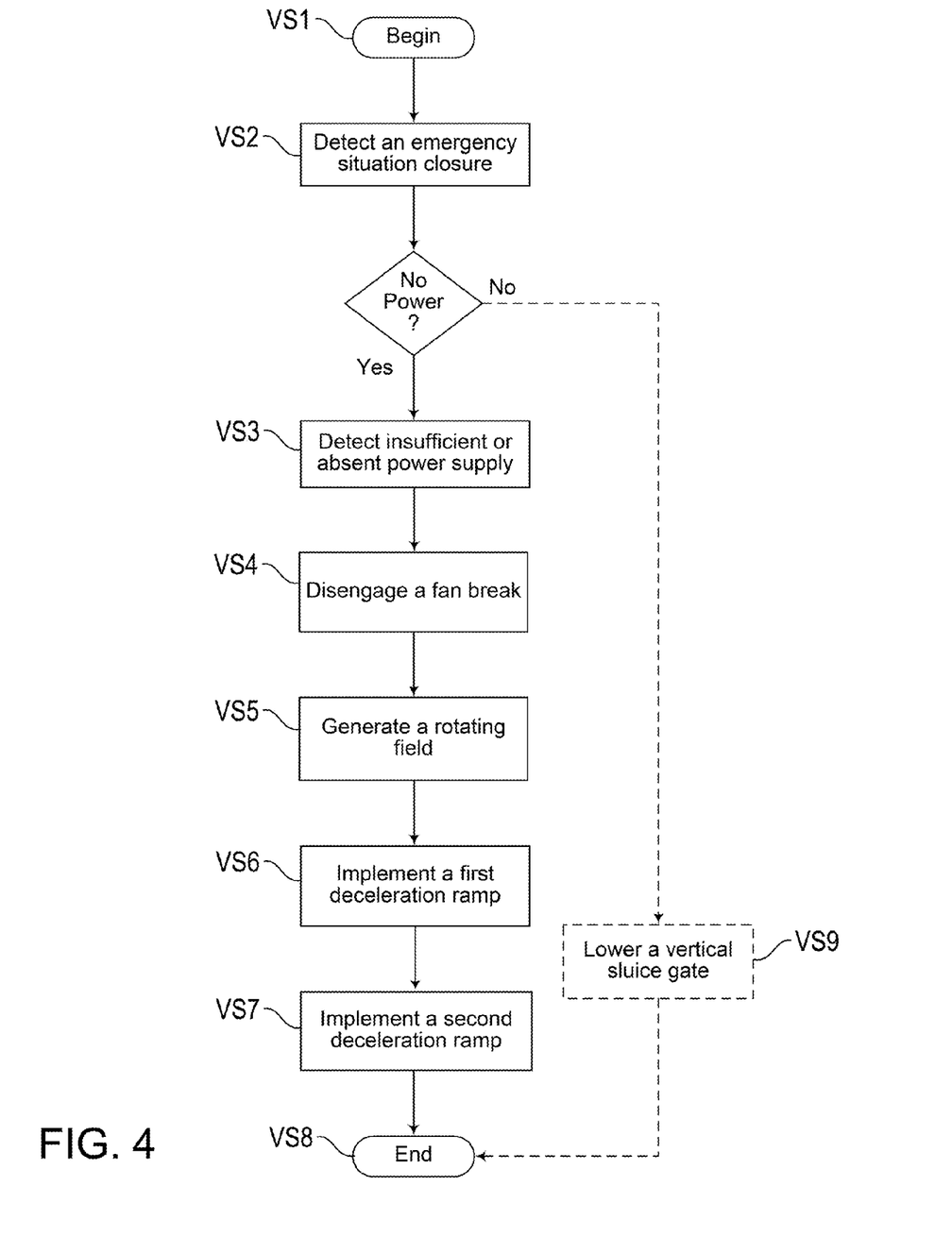
FIG. 4 a schematic illustration of a flow diagram of a preferred embodiment of a method for controlling a water sluice gate drive for a water sluice gate having an asynchronous machine with the detection of an emergency closure situation.

FIG. 4 shows in detail the sequence of steps in an emergency closure control method for the water sluice gate drive 200 by means of the service connection 700, or concretely by means of the second part of the service connection 700 respectively, specifically for the emergency operation connection while using the second power phase element 730

At the beginning of the method, in a first step VS1, the service connection 700 is in normal operation, i.e., a current is applied to the normal operation contactor 720 and therefore that contactor is closed, as is shown in FIG. 3. The asynchronous machine 210 can be operated as a motor by means of the power supply from the grid 600, via the frequency converter 712 and the normal operation contactor 720. If an emergency closure situation is detected in a second method step VS2, in principle the water sluice gate drive 200 may be actuated by means of the frequency converter 712 using the power supply from the grid 600. During normal operation, the drive may be operated by means of the frequency converter 712 at different and, if necessary, variable speeds; this may be done to slowly lift the vertical sluice gate 110 with acceleration and deceleration ramps, for example, or to slowly lower that sluice gate with acceleration and deceleration ramps. In principle, an emergency closure may also be performed with a specific deceleration ramp when the grid 600 is available. In particular, this may also comprise common electric braking methods by means of a generative operation of the asynchronous machine 210.

If, in a further method step VS3, it is detected that no power supply from the grid 600 is possible (Y path), the present method of controlling the water sluice gate drive 200 provides the advantage that this may be passively achieved. This means that in that case, the method of controlling the water sluice gate drive 200 may be carried out without an external energy supply from the grid 600 and also without an energy supply from an uninterrupted power supply UPS, which may be provided in addition to the frequency converters 712.

In a modification of the embodiment shown in FIG. 3, an uninterrupted power supply UPS may be provided; the passive method presented here offers the advantage, however, that it is possible to save on costly uninterrupted power supply systems.

If, in a synopsis of the method steps VS2, VS3, the situation arises that an emergency closure of the water sluice gate 100 is also needed without a power supply, this may be detected and indicated by the indicating unit 270. In a fourth method step VS4, a fan brake 230 may be disengaged by the exemplary actuator unit 240 described above.

In this case, an actuation of the asynchronous machine 210 as a generator corresponding to the weight force G of the vertical sluice gate 110 follows, and a rotating field is thereby generated in the method step VS5 by means of the stage 731 of excitation capacitors 731.1, 731.2, 731.3. A corresponding voltage and a thereby generated control current in a control current line 720' may be used to open the normal operation relay 720 in so far as this does not open in a self-actuating manner, if said relay is designed as a relay that is activated when it is in a de-energized state.

A control current provided in a control current line 721' may connect the first stage 732 of load resistors 732.1, 732.2, 732.3 depending on the voltage and/or depending on a position of the water sluice gate, or at a first rotational speed n− respectively; this may be done, for example, in order to appropriately brake a vertical sluice gate 110 that is lowering between 50% and 95% of the stretch, i.e., in the travel region B90 indicated in FIG. 2.

In the case of an even greater increase in the rotational speed n+ or when a second control current is reached in a second control voltage line 722' respectively, the second emergency operation contactor 722 may be switched in order to connect the second stage 733 of load resistors 733.1, 733.2, 733.3. Additionally or alternatively, the position of the roller sluice gate may be crucial to the switching. In a second, steeper deceleration ramp, this may create a substantial residual braking of the vertical sluice gate 110 in the drop region B10 indicated in FIG. 2. Thus in the method step VS6, a first deceleration ramp can be implemented by means of the first unit 732 of load resistors and in the method step VS7, a second deceleration ramp may be implemented by means of a second unit 733 of load resistors. Thus during emergency operation, a first and second deceleration ramp can be run passively by means of the second part of the service connection, specifically the second power phase element 730. In this manner, a secure braking of the vertical sluice gate 110 can be implemented even without the grid and/or without frequency converter 712; a passive actuation of the vertical sluice gate 110 can be implemented by means of the above explained actuator unit 240 using the control valve 243, which is open when not under current.

In the case that a power supply from the grid 600 is present even in the event of an emergency closure and in the case of a functioning frequency converter 712 (N path) the method steps VS4 and VS5 may nevertheless be carried out. A lowering of the vertical sluice gate 110 may nevertheless be current-controlled in the method step VS9. The method ends with a lowered vertical sluice gate in step VS8.

The invention claimed is:

1. A method for controlling a water sluice gate drive for a water sluice gate in a hydroelectric power plant, the method comprising:
   detecting an emergency closure situation;
   detecting an insufficient or absent power supply;
   in response to detecting the insufficient power supply, disengaging a fan brake of an asynchronous machine;
   in response to disengaging the fan brake, actuating operation of the asynchronous machine in a generative island operation and under an influence of a weight force of a vertical sluice gate of the water sluice gate;
   generating, by a capacitor array of excitation capacitors, a rotating field in a self-actuating manner;
   selecting at least one of a first speed step and a second speed step depending on at least one of a voltage and a position of the water sluice gate; and
   regulating the asynchronous machine in at least one of the first speed step and the second speed step using at least one of a first stage of load resistors and a second stage of load resistors,
   wherein at least one of first and second controls or adjustment control stages is run for the asynchronous machine while load shifting to the fan brake.

2. The method according to claim 1, further comprising:
   in response to detecting the sufficient power supply, detecting a power supply from at least one of a grid and a system for an uninterrupted power supply; and
   operating the asynchronous machine using the power supply.

3. The method according to claim 1, further comprising:
   operating the asynchronous machine at variable rotational speeds in the event that the sufficient power supply is detected.

4. The method according to claim 1, further comprising:
   operating the asynchronous machine to close the water sluice gate; and
   running an electric deceleration ramp for the asynchronous machine in the event that the sufficient power supply is detected.

5. The method according to claim 1,
   wherein the insufficient power supply is detected in a system for an uninterrupted power supply.

6. The method according to claim 1, further comprising:
   in the event that the insufficient power supply is detected, operating the asynchronous machine at different rotational speeds and without a power supply.

7. The method according to claim 1, wherein disengaging the fan brake includes an automatic and self-actuated lifting of the fan brake.

8. A water sluice gate drive for a water sluice gate for control of an asynchronous machine in a hydroelectric power plant, the water sluice gate drive comprising:
   a fan brake;
   an indicating unit configured to:
      detect an emergency closure situation; and
      detect an insufficient or absent power supply;
   an actuator unit configured to disengage the fan brake in the event that the insufficient power supply is detected; and
   a service connection for controlling the water sluice gate drive for self-actuated operation of the asynchronous machine, the service connection including:
      a first stage of connectable load resistors having a first quantity of connectable load resistors;
      a second stage of connectable load resistors having a second quantity of connectable load resistors;
      a first control phase element configured to connect the first and second stages of connectable load resistors depending on at least one of a voltage and a position of the water sluice gate; and
      a capacitor array of excitation capacitors configured to generate a rotating field in a self-actuating manner;
   wherein the service connection is configured to:
      operate the asynchronous machine in a generative island operation and under an influence of a weight force of a vertical sluice gate of the water sluice gate;
      operate the first control phase element to regulate the asynchronous machine in at least a first speed step and a second speed step, wherein the first and second speed steps being selected depending on at least one of the voltage and the position of the water sluice gate; and
      wherein at least one of first and second control or adjustment control stages are run for the asynchronous machine while load shifting to the fan brake.

9. The water sluice gate drive according to claim 8,
   wherein the actuator unit includes a gas spring accumulator configured to disengage a brake spring of the fan brake.

10. The water sluice gate drive according to claim 8,
    wherein the actuator unit has a control valve that is closed when energized and open when not energized, said control valve being located in an actuator pressure line between a pressure accumulator and a gas spring accumulator for the actuation of a brake spring of the fan brake.

11. The water sluice gate drive according to claim 8, wherein the service connection in a second control phase element is configured to electrically control the asynchronous machine at a variable rotational speed by a conventional control current supply from a grid.

12. The water sluice gate drive according to claim 8, wherein the service connection in a second control phase element is independent of a system for an uninterrupted power supply.

13. A hydroelectric power plant comprising:
a water sluice gate drive according to claim 8 that is configured to control of an electric machine for a water sluice gate.

* * * * *

UNITED STATES PATENT AND TRADEMARK OFFICE
CERTIFICATE OF CORRECTION

PATENT NO. : 9,758,940 B2
APPLICATION NO. : 14/654355
DATED : September 12, 2017
INVENTOR(S) : Andreas Janssen et al.

It is certified that error appears in the above-identified patent and that said Letters Patent is hereby corrected as shown below:

On the Title Page

2nd Page, Item (56) Foreign Patent Documents, Line 4:
"DE    2 2010 003 347 U1    7/2010"
Should read:
--DE    20 2010 003 347 U1    7/2010--.

2nd Page, Item (56) Foreign Patent Documents, Line 24:
"TV    417704 U    1/2001"
Should read:
--TW    417704 U    1/2001--.

Signed and Sealed this
Fourteenth Day of August, 2018

Andrei Iancu
*Director of the United States Patent and Trademark Office*